UNITED STATES PATENT OFFICE.

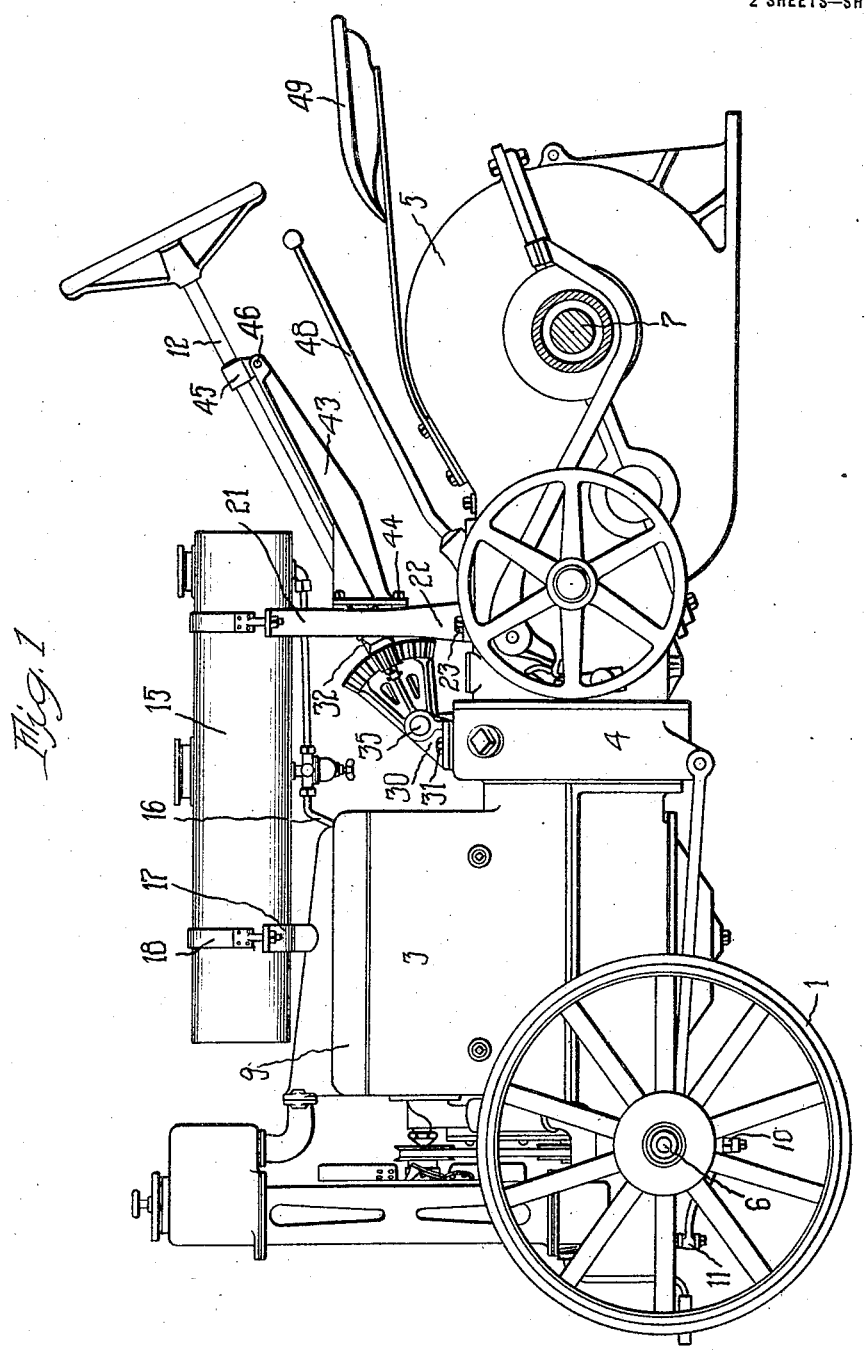

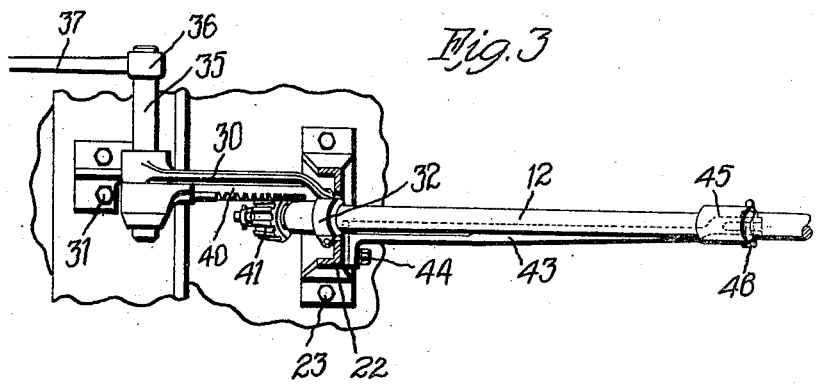
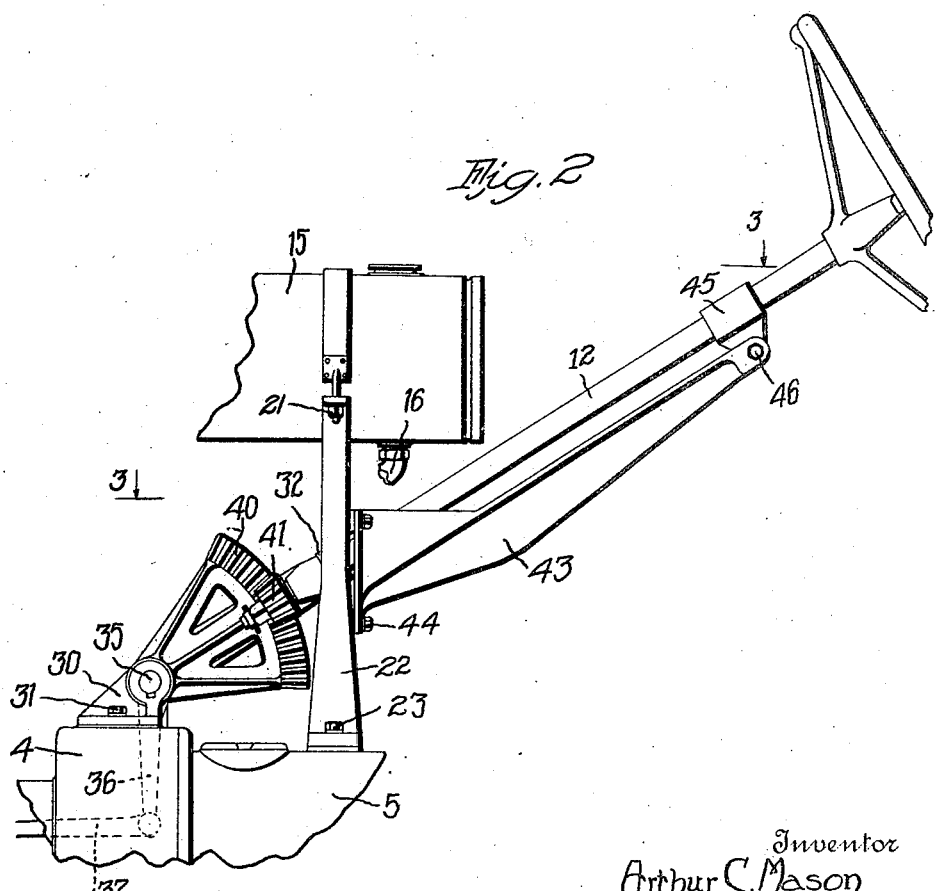

ARTHUR C. MASON, OF FLINT, MICHIGAN, ASSIGNOR TO GENERAL MOTORS CORPORATION, OF DETROIT, MICHIGAN, A CORPORATION OF DELAWARE.

STEERING-GEAR AND FUEL-TANK SUPPORT.

1,417,192.     Specification of Letters Patent.     Patented May 23, 1922.

Application filed March 22, 1920. Serial No. 367,934.

*To all whom it may concern:*

Be it known that I, ARTHUR C. MASON, a citizen of the United States, and resident of Flint, Genesee County, State of Michigan, have invented certain new and useful Improvements in Steering-Gear and Fuel-Tank Supports, of which the following is a specification.

The present invention relates to tractors, particularly to those of the type wherein the engine casing and the transmission casing act as elements of the frame, its purpose being to provide a combined steering gear support and fuel tank which shall be of minimum expense and which shall also permit of the driving of the vehicle from a seat located well back from the hotter portions of the frame. The invention consists in the details of construction hereinafter pointed out and claimed.

In the drawings, Fig. 1 is a side view of a tractor equipped with a preferred embodiment of the invention, the rear wheels being removed to more clearly show the construction.

Fig. 2 is an enlarged fragmentary side view corresponding thereto.

Fig. 3 is a plan view taken on the line 3—3 of Fig. 2.

1 indicates the front wheels; 3, the engine casing (in which is included as an extension the clutch casing 4); and 5, the transmission casing, it being understood that the elements 3 and 5 together make up the frame for joining the front and rear axles 6 and 7 the former of which may be centrally pivotly connected to said frame in the usual way. The engine casing extends upwardly considerably above the transmission casing and includes the head casting or structure 9. The front wheels are connected to the axle by the usual steering spindle constructions 10, cross-connected by the link 11 whereby both wheels are turned in unison, and the spindles are turned and controlled through the medium of the steering shaft or rod 12 and associated elements hereinafter described.

15 indicates a fuel tank which may be of any desired construction and from which fuel is conducted to the engine through the pipe 16. At its front end the tank is preferably carried in a strap or bracket 17 bolted centrally to the head casting, and having associated therewith the retaining strap 18. The rear end of the tank likewise rests in the divided upper end 21 of a bracket 22 mounted as by means of the cap screws 23 on a boss or pad formed on the transmission casing, preferably a short distance rearwardly from the clutch housing extension 4. Associated with the bracket 22 is an upwardly and rearwardly inclined element or casting 30 attached by cap screws 31 or the like to the frame, preferably to the clutch housing 4; this element includes the lower bearing 32 for the steering shaft 12 and also forms a bearing for the rock shaft 35 that carries the steering arm 36 through which and the link 37 steering force is transmitted to the elements 10—11 in the usual way. Keyed or otherwise fixed on the rock shaft is a gear segment 40 which meshes with a bevel pinion 41 fixed to the lower end of the steering shaft 12. For properly bracing the upper end portion of the shaft 12, I preferably provide the rearwardly and upwardly inclined arm 43, bolted at 44 to the element 22 and carrying at its free end a second bearing 45 for said shaft, said second bearing also preferably being attached by a pivotal connection 46 to permit slight relative pivotal movement without inducing binding on the shaft.

In this manner a strong and inexpensive support for both tank and steering gear is formed, and those parts which primarily apply to the tank support act also through the arm 43 to carry the upper end of the steering shaft; moreover, the arrangement of the arm 43 with reference to the upwardly and rearwardly inclined gear shifting or speed changing lever 48 permits the latter to be swung freely up, down and cross-wise about its lower end from the normal position shown, as will be readily understood, and the seat 49 may therefore be positioned well back on the frame to support the driver away from the more heated portions thereof.

The details of construction may, of course, be varied, and I do not, therefore, wish to be limited except as indicated by the subjoined claims.

1. In a self propelled vehicle having a frame including an engine casing the rear end of which forms a clutch housing, said frame also including a transmission casing fixed to said clutch housing, a fixture mounted on said clutch housing, a rock shaft supported by the fixture, said rock shaft forming part of a steering gear for the vehicle, a rearwardly inclined steering shaft having its lower end carried by said fixture, a supporting bracket separate from the fixture and mounted on the transmission casing, and having a rearwardly extending upwardly inclined arm intermediate its ends and the upper end of which arm serves as a support for the upper end of said steering shaft, and means for turning the rock shaft, from the steering shaft.

2. In a self propelled vehicle, a main frame, a steering gear including a rock shaft, an inclined steering shaft for turning said rock shaft to steer the vehicle, a support common to the lower end portion of the steering shaft and to said rock shaft, and a tank supporting bracket, separate from the first named support and secured to the frame adjacent the lower end of the steering shaft, and which bracket is provided with a rearwardly and upwardly extending arm on which the upper end portion of the steering shaft is carried.

3. In a self propelled vehicle, a main frame, a steering gear including a rock shaft, an inclined steering shaft connected to turn said rock shaft, a support for the lower end portion of said steering shaft and for said rock shaft, a second support for the upper end portion of the steering shaft, said second support including an upright supporting portion and an arm extending upwardly and rearwardly at an angle from said upright and along the steering shaft and having a bearing at its extremity for supporting the upper end of said steering shaft, said arm being detachable from the upright.

4. In a self propelled vehicle, an upwardly and rearwardly inclined steering shaft, an upwardly and rearwardly inclined arm extending along said shaft, an upwardly extending tank supporting bracket to which the lower end of said inclined arm is secured, and a bearing for said shaft pivotally connected to the upper end portion of the arm.

In testimony whereof I affix my signature.

ARTHUR C. MASON.